US012614899B2

(12) United States Patent
Aramaki et al.

(10) Patent No.: US 12,614,899 B2
(45) Date of Patent: Apr. 28, 2026

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Osaka (JP); Housei Mizuno, Osaka (JP); Kyousyou Kou, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LID., Osaka (JP)

( * ) Notice: Subject to any disclaimer, the term of this patent is extended or adjusted under 35 U.S.C. 154(b) by 205 days.

(21) Appl. No.: 18/569,018

(22) PCT Filed: Jun. 10, 2022

(86) PCT No.: PCT/JP2022/023411
§ 371 (c)(1),
(2) Date: Dec. 11, 2023

(87) PCT Pub. No.: WO2023/276609
PCT Pub. Date: Jan. 5, 2023

(65) Prior Publication Data
US 2024/0275146 A1 Aug. 15, 2024

(30) Foreign Application Priority Data
Jun. 30, 2021 (JP) ................................. 2021-108639

(51) Int. Cl.
*H02G 3/04* (2006.01)
(52) U.S. Cl.
CPC ................................. *H02G 3/0437* (2013.01)

(58) Field of Classification Search
None
See application file for complete search history.

(56) References Cited

U.S. PATENT DOCUMENTS 3,023,692 A * 3/1962 Crown ................. H02G 3/0456
174/72 A
3,733,428 A * 5/1973 Fry ...................... H01B 7/0846
156/290
(Continued)

FOREIGN PATENT DOCUMENTS

JP 8-507641 8/1996
JP 2015-12740 1/2015
(Continued)

OTHER PUBLICATIONS

International Search Report issued in International Patent Application No. PCT/JP2022/023411, dated Aug. 23, 2022.
(Continued)

*Primary Examiner* — Krystal Robinson
(74) *Attorney, Agent, or Firm* — Greenblum & Bernstein, P.L.C.

(57) ABSTRACT

A wiring member includes a wire-like transmission member and a first sheet and a second sheet sandwiching the wire-like transmission member. The first sheet includes a sandwiching part sandwiching the wire-like transmission member with the second sheet and a fixing part protruding to a lateral side of the wire-like transmission member from the sandwiching part to be fixed to the second sheet. The first sheet and the second sheet are closer to each other in a position of the fixing part in a thickness direction in relation to a position of the sandwiching part. An easy bending part in which the first sheet can be easily bended between the sandwiching part and the fixing part is formed in the first sheet.

8 Claims, 7 Drawing Sheets

(56) References Cited

U.S. PATENT DOCUMENTS

| | | | | |
|---|---|---|---|---|
| 3,775,552 A | * | 11/1973 | Schumacher | H01B 7/0838 |
| | | | | 174/105 R |
| 4,034,148 A | * | 7/1977 | Lang | H01B 7/0876 |
| | | | | 174/34 |
| 4,481,379 A | * | 11/1984 | Bolick, Jr | H01B 7/0838 |
| | | | | 174/117 F |
| 4,777,325 A | * | 10/1988 | Siwinski | H01B 7/0876 |
| | | | | 174/113 AS |
| 5,502,287 A | * | 3/1996 | Nguyen | H01B 7/0846 |
| | | | | 174/117 A |
| 6,142,556 A | * | 11/2000 | Tanaka | B60R 16/0207 |
| | | | | 296/146.7 |
| 8,697,994 B2 | * | 4/2014 | Masaka | G03G 21/1652 |
| | | | | 174/99 R |
| 9,355,756 B2 | * | 5/2016 | Gundel | H01B 7/0838 |
| 11,735,336 B2 | * | 8/2023 | Nakano | H01B 7/40 |
| | | | | 174/95 |
| 2002/0038716 A1 | * | 4/2002 | Pineda | H02G 9/04 |
| | | | | 174/68.3 |
| 2017/0164528 A1 | * | 6/2017 | Wakabayashi | H05K 1/0228 |
| 2021/0020331 A1 | | 1/2021 | Mizuno et al. | |
| 2021/0210249 A1 | | 7/2021 | Matsuo et al. | |
| 2022/0139594 A1 | * | 5/2022 | Nakano | H01B 7/0823 |
| | | | | 174/117 F |
| 2022/0310284 A1 | * | 9/2022 | Nishimura | H01B 7/40 |
| 2022/0406488 A1 | | 12/2022 | Kudo et al. | |

FOREIGN PATENT DOCUMENTS

| | | | | |
|---|---|---|---|---|
| JP | 2015-164775 | | 9/2015 | |
| JP | 2019-202730 | | 11/2019 | |
| WO | 2014/038259 | | 3/2014 | |
| WO | WO-2018155166 A1 | * | 8/2018 | B60R 16/0215 |
| WO | 2019/189177 | | 10/2019 | |
| WO | 2021/095524 | | 5/2021 | |

OTHER PUBLICATIONS

Japan, Notice of Reasons for Refusal received in Japanese Patent Application No. 2021-108639, dated Jul. 30, 2024.

* cited by examiner

F I G. 1
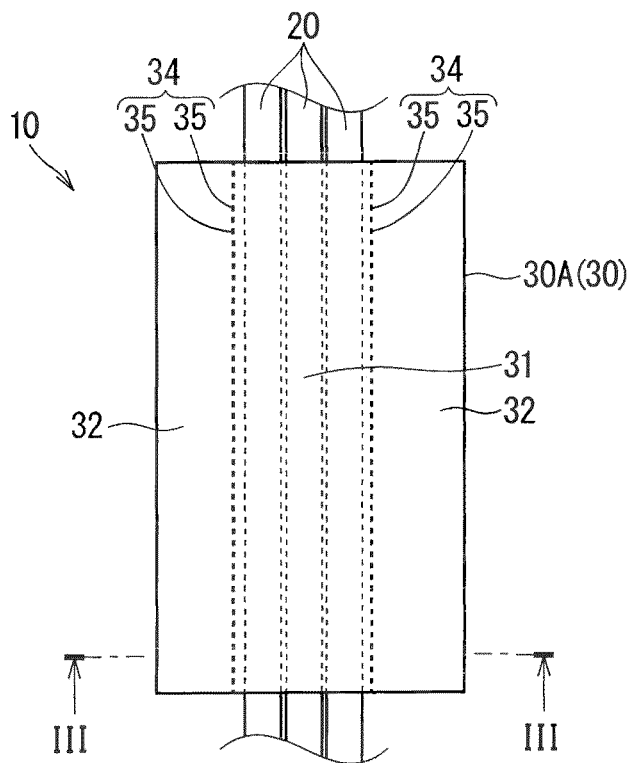

F I G. 7
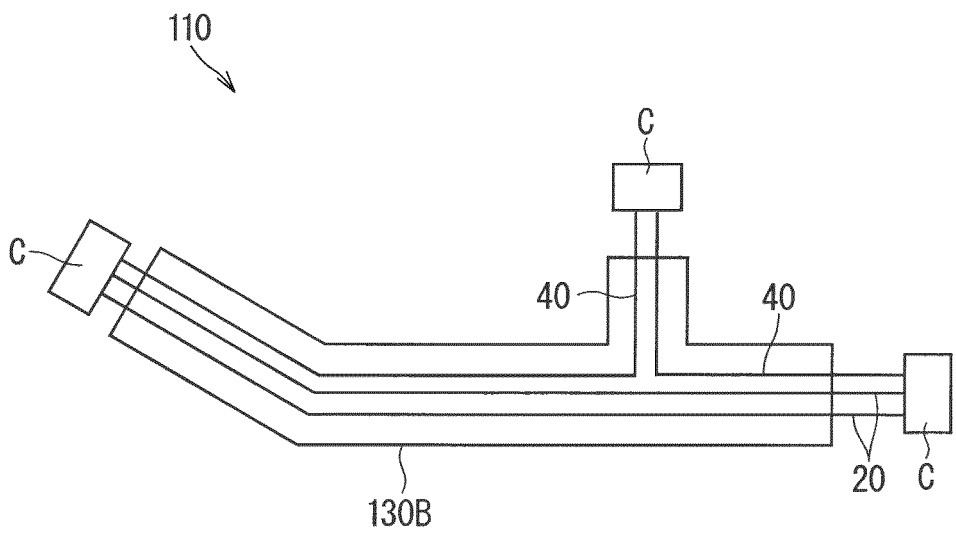

WIRING MEMBER

TECHNICAL FIELD

The present disclosure relates to a wiring member.

BACKGROUND ART

Patent Document 1 discloses a technique of keeping a plurality of electrical wires flat. In Patent Document 1, the plurality of electrical wires are sandwiched by two sheets to be kept flat, for example.

PRIOR ART DOCUMENTS

Patent Document(s)

Patent Document 1: Japanese Patent Application Laid-Open No. 2019-202730

SUMMARY

Problem to be Solved by the Invention

It is desired that two sheets sandwiching a plurality of electrical wires are favorably fixed.

Accordingly, an object is to provide a technique capable of favorably fixing two sheets sandwiching a wire-like transmission member.

Means to Solve the Problem

A wiring member according to the present disclosure is a wiring member including: a wire-like transmission member; and a first sheet and a second sheet sandwiching the wire-like transmission member, wherein the first sheet includes a sandwiching part sandwiching the wire-like transmission member with the second sheet and a fixing part protruding to a lateral side of the wire-like transmission member from the sandwiching part to be fixed to the second sheet, the first sheet and the second sheet are closer to each other in a position of the fixing part in a thickness direction in relation to a position of the sandwiching part, and an easy bending part in which the first sheet can be easily bended between the sandwiching part and the fixing part is formed in the first sheet.

Effects of the Invention

According to the present disclosure, two sheets sandwiching the wire-like transmission member can be favorably fixed.

BRIEF DESCRIPTION OF DRAWINGS

FIG. 1 is a plan view illustrating a wiring member according to an embodiment 1.

FIG. 7 is a schematic plan view illustrating a wiring member according to an embodiment 2.

DESCRIPTION OF EMBODIMENT(S)

Description of Embodiment of Present Disclosure

Figure 2:
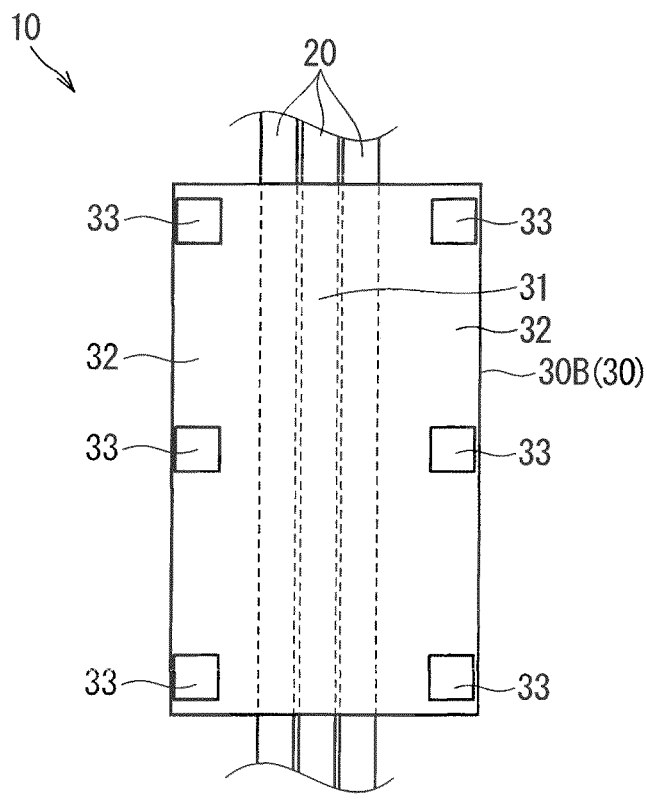
FIG. 2 is a bottom view illustrating the wiring member according to the embodiment 1.

Embodiments of the Present Disclosure are Listed and Described Firstly.

A wiring member according to the present disclosure is as follows.

(1) A wiring member includes: a wire-like transmission member; and a first sheet and a second sheet sandwiching the wire-like transmission member, wherein the first sheet includes a sandwiching part sandwiching the wire-like transmission member with the second sheet and a fixing part protruding to a lateral side of the wire-like transmission member from the sandwiching part to be fixed to the second sheet, the first sheet and the second sheet are closer to each other in a position of the fixing part in a thickness direction in relation to a position of the sandwiching part, and an easy bending part in which the first sheet can be easily bended between the sandwiching part and the fixing part is formed in the first sheet. When the fixing part is provided while the sandwiching part sandwiches the electrical wire, a part of the first sheet serving as the fixing part is easily bended to be close to be parallel to the second sheet by the easy bending part. Accordingly, the fixing part is easily provided.

(2) In the wiring member according to (1), the first sheet may be partially provided to the second sheet along an extension direction of the wire-like transmission member. Accordingly, the first sheet is smaller than the second sheet along the extension direction of the wire-like transmission member, thus the easy bending part can be simply provided.

(3) In the wiring member according to (1) or (2), the easy bending part may include a first easy bending part provided to an end portion on an inner side of the fixing part along a width direction of the first sheet. Accordingly, a part of the first sheet serving as the fixing part is easily bended to be close to be parallel to the second sheet. Accordingly, the fixing part is easily provided.

(4) In the wiring member according to (3), the easy bending part may include a second easy bending part provided in a position closer to the wire-like transmission member than the first easy bending part along the width direction of the first sheet. Accordingly, when the sandwiching part of the first sheet is disposed in a groove of a mold, the first sheet is easily bended along an inner surface of the groove of the mold.

(5) In the wiring member according to any one of (1) to (4), the fixing part may be a fusion part. Accordingly, the first sheet and the second sheet can be directly fixed without intervention of the other member. At this time, the first sheet and the second sheet have contact with each other in the fixing part, thus a dimension of the sandwiching part and the fixing part away from each other in the thickness direction gets large compared with a case where an adhesive agent, for example, intervenes therebetween. Also in this case, the easy bending part is located, thus the fixing part is easily provided.

(6) In the wiring member according to (5), it is applicable that the fixing part is an ultrasonic fusion part, and a horn mark is formed in an outer surface of the second sheet. Accordingly, the first sheet is disposed in an anvil, and ultrasonic welding is performed so that a horn comes in contact with the second sheet. At this time, the first sheet includes the easy bending part, thus when the first sheet is disposed in the anvil with the groove, a part as the fixing part is easily bended to be close to be parallel to the second sheet.

(7) In the wiring member according to (5) or (6), it is applicable that the first sheet or the second sheet includes an extension part extending to a lateral side of the fixing part, another wire-like transmission member different from the wire-like transmission member is disposed on the extension part, and a covering layer of the another wire-like transmission member is fused to the extension part. Accordingly, the wire-like transmission member and the other wire-like transmission member are simply held by the first sheet and the second sheet.

Detailed Description of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 3:
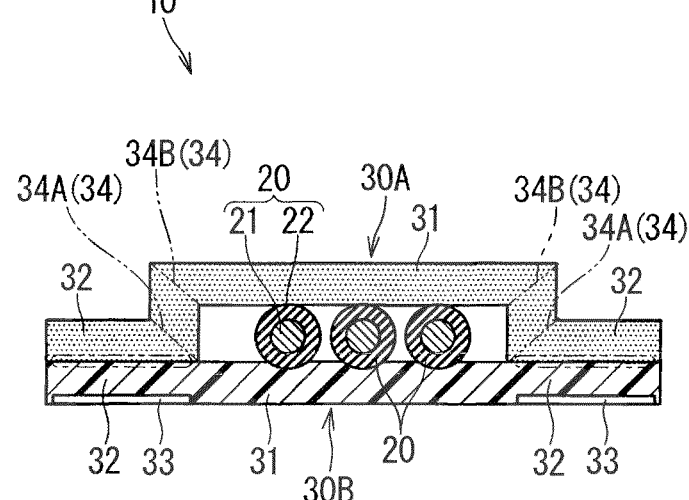
FIG. 3 is a cross-sectional view along a III-III line in FIG. 1.

A wiring member according to an embodiment 1 is described hereinafter. FIG. 1 is a plan view illustrating a wiring member 10 according to the embodiment 1. FIG. 2 is a bottom view illustrating the wiring member 10 according to the embodiment 1. FIG. 3 is a cross-sectional view along a III-III line in FIG. 1.

The wiring member 10 electrically connects various types of component in a vehicle, for example (or connects them so that they can perform optical communication). The wiring member 10 transmits electricity or light, thereby supplying electrical power to an apparatus or transmitting a signal between apparatuses. The wiring member 10 includes a wire-like transmission member 20 and a plurality of sheets 30. The plurality of sheets 30 sandwich at least an intermediate section of the wire-like transmission member 20. The sheet 30 is formed into a flat shape as a whole. The sheets 30 sandwich the plurality of wire-like transmission members 20 to keep the wiring member 10 in a flat state. Herein, two sheets 30 sandwich the wire-like transmission member 20. When two sheets 30 need to be distinguished, they are referred to as sheets 30A and 30B, and when they need not be distinguished, they are referred to as the sheets 30.

The wire-like transmission member 20 is a wire-like member transmitting electricity or light, for example. The wire-like transmission member 20 includes a transmission wire body 21 and a covering layer 22. The transmission wire body 21 is a transmission route transmitting electrical power or light. For example, when the wire-like transmission member 20 is an electrical wire, the transmission wire body 21 is a conductor core wire. The conductor core wire is made up of one or a plurality of strands. The strand is formed of copper, copper alloy, aluminum, or aluminum alloy as a material, for example. For example, when the wire-like transmission member 20 is an optical fiber, the transmission wire body 21 is a core and a clad. The covering layer 22 covers the transmission wire body 21. A resin material constituting the covering layer 22 is not particularly limited, but can be appropriately set. For example, the wire-like transmission member 20 may be a general wire having a core wire and a covering layer 22 around the core wire, or may also be a shield wire, a twisted wire, an enamel wire, a nichrome wire, or an optical fiber.

The wire-like transmission member 20 transmitting the electricity may be various kinds of signal lines or various kinds of power lines. Some of the wire-like transmission members 20 transmitting the electricity may be used as an antenna or coil, for example, transmitting or receiving a signal or electrical power to or from a space.

The wire-like transmission member 20 may be a single core wire. The single core wire is a single wire-like object. The single core wire is the wire-like transmission member with one transmission route. The wire-like transmission member 20 may be a multicore wire. The multicore wire is a compound body of a plurality of wire-like objects. The multicore wire is the wire-like transmission member with a plurality of transmission routes. The multicore wire may be a cable made up of collected twisted wires or a plurality of wire-like objects covered by a sheath, for example.

It is sufficient that each sheet 30 keeps sandwiching the wire-like transmission member 20, thus a material and a structure, for example, are not particularly limited. With regard to a material constituting the sheet 30, the sheet 30 is formed of a resin material herein. A material other than resin such as metal or an inorganic material, for example, may be used for the material constituting the sheet 30. With regard to the structure of the sheet 30, the sheet 30 has a double layer structure herein. The structure of the sheet 30 may be a single layer structure, or a multilayer structure of three or more layers is also applicable.

The sheet 30 includes a first layer and a second layer. The first layer is a fusion layer. The wire-like transmission member 20 is fused and fixed to the fusion layer. The fusion layer includes a resin material, or preferably includes a thermoplastic resin material. The resin material of the fusion layer is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the fusion layer is not particularly limited. For example, the fusion layer may be a sheet having an evenly filled cross-sectional surface (also referred to as a non-foam sheet or a solid sheet, for example). The fusion layer is also considered a foam sheet, for example. The fusion layer is also considered a fibrous material sheet such as a braided cloth, a woven cloth, or a non-woven cloth, for example. One surface of the first layer is a first surface of the sheet 30.

The second layer is formed of a material different from that of the fusion layer, or has a different structure. The second layer increases a function of the fusion layer, or adds a function which the fusion layer does not have to the sheet 30. A material constituting the second layer is a material described for the fusion layer described above, metal, or an inorganic material, for example. A structure of the second layer may be any of the structure described for the fusion layer described above. One surface of the second layer is a second surface of the sheet 30.

The first layer and the second layer are fixed to each other while the other surface of the first layer and the other surface of the second layer have contact with each other. A fixing state of the first layer and the second layer is not particularly limited, however, fixing by fusion or adhesion is preferable. For example, when at least one of the first layer and the second layer is a sheet having voids in a surface such as a fibrous material sheet or a foam sheet, a resin material or an adhesive agent enters the voids and the layers can be fixed to each other. Such a configuration causes so-called anchor effect, thus the first layer and the second layer are rigidly fixed.

In the description herein, the first layer is a solid sheet made of resin and the second layer is a fibrous material sheet. In the description herein, the first layer and the second layer are fused to each other. That is to say, the resin of the first layer enters between the fibers of the second layer while having flowability, and is then hardened. Maintained accordingly is a state where the resin of the first layer enters between the fibers of the second layer, and the first layer and the second layer are rigidly fixed to each other.

The first layer and the second layer are formed to have the same size (the same planar shape). One of the first layer and the second layer may also be formed to be larger than the other one thereof. The first layer and the second layer are wholly fixed at a region where they have contact with each other. The first layer and the second layer may also be fixed only at a part of a region where they have contact with each other.

The sheet 30 may be a flexible member. For example, the first layer is a solid sheet made up of flexible resin such as flexible PVC as a material, the second layer is a non-woven cloth made up of PET as a material, and the sheet 30 is a flexible member. The sheet 30 may have flexibility so as to be able to follow bending of the wire-like transmission member 20. It is also applicable that the wiring member 10 can be bent in a thickness direction (bending so that a fold line follows the main surface of the sheet 30).

A material and a layer structure of the sheet 30A are the same as those of the sheet 30B. A material and a layer structure of the sheet 30A may be different from those of the sheet 30B. For example, it is applicable that the sheet 30A has a single layer structure of only the first layer and the sheet 30B has a double layer structure of a first layer and a second layer. A planar shape of the sheet 30A is the same as that of the sheet 30B. A planar shape of the sheet 30A may be different from that of the sheet 30B.

Each cover 30 includes a sandwiching part 31 and a fixing part 32. The sandwiching part 31 is a part sandwiching the wire-like transmission member 20 between the plurality of sheets 30. The sandwiching part 31 of one sheet 30A covers one side of the wire-like transmission member 20, and the sandwiching part 31 of the other sheet 30B covers the other side of the wire-like transmission member 20. The sandwiching part 31 of the sheet 30A and the sandwiching part 31 of the sheet 30B sandwich the wire-like transmission member 20 therebetween, thus are away from each other in a thickness direction. The fixing part 32 protrudes to a lateral side of the wire-like transmission member 20 from the sandwiching part 31. The fixing part 32 of one sheet 30A is fixed to the fixing part 32 of the other sheet 30B. The sheets 30A and 30B are closer to each other in the thickness direction in a position of the fixing part 32 than the sandwiching part 31.

At least one of the sheets 30A and 30B is bended in the thickness direction from the sandwiching part 31 toward the fixing part 32. In the example illustrated in FIG. 3, only the sheet 30A in the sheets 30A and 30B is bended in the thickness direction from the sandwiching part 31 toward the fixing part 32. The sheet 30B remains flat. Only the sheet 30B in the sheets 30A and 30B may be bended in the thickness direction from the sandwiching part 31 toward the fixing part 32. Both the sheets 30A and 30B may be bended in the thickness direction from the sandwiching part 31 toward the fixing part 32. In this case, a degree of bending of the sheet 30A may be the same as that of the sheet 30B. It is also applicable that the sheet 30A is bended with a larger degree than the sheet 30B, or the sheet 30B is bended with a larger degree than the sheet 30A. The degree of bending of the sheet 30A and the degree of bending of the sheet 30B can be determined by rigidity of the sheets 30A and 30B and a way of forming the fixing part 32, for example.

Any fixing state may be applied as the fixing state of the fixing part 32. Applicable as the fixing state are a contact area fixation and a non-contact area fixation, or both fixations may be used together. Herein, the contact area fixation indicates that a portion where the sheets 30A and 30B have contact with each other is stuck and fixed. The non-contact area fixation is a fixing state which is not the contact area fixation, and indicates that a sewing thread, a cover, or an adhesive tape presses one of the sheets 30A and 30B toward the other one thereof or sandwiches the sheets 30A and 30B to keep them in a fixing state. In the description hereinafter, the sheets 30A and 30B are in the state of the contact area fixation.

Applicable as the configuration of the contact area fixation are a contact area indirect fixation and a contact area direct fixation, or both fixations may also be used together in different regions. Herein, the contact area indirect fixation indicates that the sheets 30A and 30B are indirectly stuck and fixed via an adhesive agent, a gluing agent, and a double-sided adhesive tape provided therebetween. The contact area direct fixation indicates that the sheets 30A and 30B are directly stuck and fixed without an intervention of the adhesive agent, for example, which is separately provided. Considered in the contact area direct fixation is that resin included in at least one of the sheets 30A and 30B is melted, thus are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. The sheets 30A and 30B are fused to each other in the fixing part 32 herein. The fixing part 32 is the fusion part 32. For example, a surface layer of the sheet 30A and a surface layer of the sheet 30B are fused to each other. A material of the surface layer of the sheet 30A and a material of the surface layer of the sheet 30B is preferably compatible with each other. Herein, a resin material constituting surface layer of the sheet 30A and a resin material constituting the surface layer of the sheet 30B are the same type of material. For example, both the surface layer of the sheet 30A and the surface layer of the sheet 30B are fusion layers. Both the sheets 30A and 30B have the fusion layer. The fusion layer of the sheet 30A and the fusion layer of the sheet 30B face each other. The fusion layer of the sheet 30A and the fusion layer of the sheet 30B are fused to each other in the fixing part 32. A resin material constituting the fusion layer is PVC or polyolefin, for example.

Herein, the fixing part 32 is the ultrasonic fusion part 32 by ultrasonic welding. The ultrasonic fusion part 32 is formed by an ultrasonic welding machine 80 including a horn 82 and an anvil 84 (refer to FIG. 5). Ultrasonic vibration is applied from the horn 82 to a work while the horn 82 and the anvil 84 sandwich the work in the ultrasonic welding machine 80. A bonding surface of the work is thereby ultrasonic-vibrated and heated, a material is partially melted and bonded.

A horn mark 33 is formed in an outer surface of the sheet 30B. The horn mark 33 is a mark marked in a part with which the horn 82 in the ultrasonic welding machine 80 comes in contact. For example, the outer surface of the sheet 30B in the fixing part 32 is concaved, and the concaved part is the horn mark 33. The sheets 30A and 30B are fixed in a position where the horn mark 33 is located.

In the example illustrated in FIG. 2, the horn mark 33 is provided in a plurality of positions at intervals in the wire-like transmission member 20 along the extension direction. The sheets 30A and 30B are not fixed in a position where the horn mark 33 is not located. The sheets 30A and 30B are not fixed between two horn marks 33 along the extension direction of the wire-like transmission member 20. The sheets 30A and 30B may be fixed over a whole length of the sheets 30A and 30B along the extension direction of the wire-like transmission member 20.

An easy bending part 34 is a part in which the sheet 30 is easily bended between the sandwiching part 31 and the fixing part 32. The sheet 30 is easily bended with a curvature radius in a part where the easy bending part 34 is located than a part where the easy bending part 34 is not located. The easy bending part 34 is formed in the sheet 30A. The easy bending part 34 is not formed in the sheet 30B. In this case, the sheet 30A is an example of a first sheet, and the sheet 30B is an example of a second sheet. The easy bending part 34 is formed in the other sheet 30A different from the sheet 30B in which the horn mark 33 is formed. The easy bending part 34 may be formed in both the sheets 30A and 30B. In this case, one of the sheets 30A and 30B can serve as the first sheet and the other one thereof can serve as the second sheet.

The easy bending part 34 extends along the extension direction of the wire-like transmission member 20. The easy bending part 34 extends along the whole length of the sheet 30 along the extension direction of the wire-like transmission member 20. When the fixing part 32 is partially provided along the extension direction of the wire-like transmission member 20, the easy bending part 34 may also be partially provided along the extension direction of the wire-like transmission member 20. For example, the easy bending part 34 may be partially provided on a lateral side of the fixing part 32.

Herein, a perforated line 34 is formed as the easy bending part 34. A plurality of perforations 35 are intermittently formed in the extension direction of the wire-like transmission member 20 to form the perforated line 34. The easy bending part 34 needs not be the perforated line 34, however, any configuration is applicable as long as it facilitates bending of the sheet 30. For example, the easy bending part 34 may be a groove in which a part of the sheet 30 is concaved in the thickness direction. The groove is formed, thus force on bending is easily concentrated on the groove.

A position of the easy bending part 34 along a width direction of the sheet 30 is near a boundary between the fixing part 32 and the sandwiching part 31. The position of the easy bending part 34 along the width direction of the sheet 30 is a position closer to the fixing part 32 in relation to a center part of the sandwiching part 31. Herein, four easy bending parts 34 are formed along the width direction of the sheet 30. Four easy bending parts 34 are formed two by two on both sides of the center part along the width direction of the sheet 30. Two easy bending parts 34 on one side in relation to the center part and two easy bending parts 34 on the other side in relation to the center part of the sheet 30 are formed in positions symmetrical with respect to the center part of the sheet 30. Two groups of easy bending parts 34A and 34B are formed in the positions symmetrical with respect to the center part of the sheet 30.

The easy bending part 34A is provided in an end portion of an inner side of the fixing part 32 along the width direction of the sheet 30A. The easy bending part 34B is provided in a position closer to the wire-like transmission member 20 than the easy bending part 34A along the width direction of the sheet 30A. The easy bending part 34A is an example of a first easy bending part, and the easy bending part 34B is an example of a second easy bending part.

In the example illustrated in FIG. 3, the sheet 30A is bended in the thickness direction at positions of the easy bending parts 34A and 34B. However, the sheet 30A may not be bended in the thickness direction at the positions of the easy bending parts 34A and 34B.

The wire-like transmission member 20 is not bonded or fused to any of the sheets 30A and 30B. The wire-like transmission member 20 can be moved along the extension direction of the wire-like transmission member 20 with respect to any of the sheets 30A and 30B. The sheets 30A and 30B forms a tubular space surrounding the wire-like transmission member 20, and the wire-like transmission member 20 is disposed to be movable in the tubular space.

The wire-like transmission member 20 may be a member hardly fused to the sheet 30. The wire-like transmission member 20 is sandwiched between the sheets 30A and 30B instead of being fused thereto, thereby being held on the sheet 30 to be in a flat state. The wire-like transmission member 20 may be a special wire fused to the sheet 30 more hardly than a normal wire. Herein, a single core electrical wire including a covering layer formed of the same material as the fusion layer of the sheet 30 is the normal wire. A state of being fused to the sheet 30 more hardly than the normal wire indicates a case where a member cannot be fused to the sheet 30 or a case where a member can be fused to the sheet 30 but it takes more trouble to fuse the member to the sheet 30 than the case of fusing the normal wire to the sheet 30 or fusion strength between the member and the sheet 30 is lower than that between the normal wire and the sheet 30 when they are fused in the same fusion condition. For example, when the special wire is a multicore cable including more transmission route than the normal wire or a shield wire or a coaxial cable having a structure with a larger number of layers than the normal wire, the special wire is fused to the sheet 30 more hardly than the normal wire. For example, reactive force at a time of pressing the special wire in fusion is not uniformly performed by reason that a horizontal section shape of the special wire is not uniform along a longitudinal direction thereof, thus is fused to the sheet 30 more hardly than the normal wire. For example, the covering layer 22 of the special wire is formed of a material fused to the sheet 30 more hardly than the covering layer of the normal wire, thus is fused to the sheet 30 more hardly than the normal wire. For example, it is applicable that the fusion layer and the covering layer of the normal wire is made of PVC, and the covering layer 22 of the special wire is made of polyolefin.

<Manufacturing Method>

Figure 4:
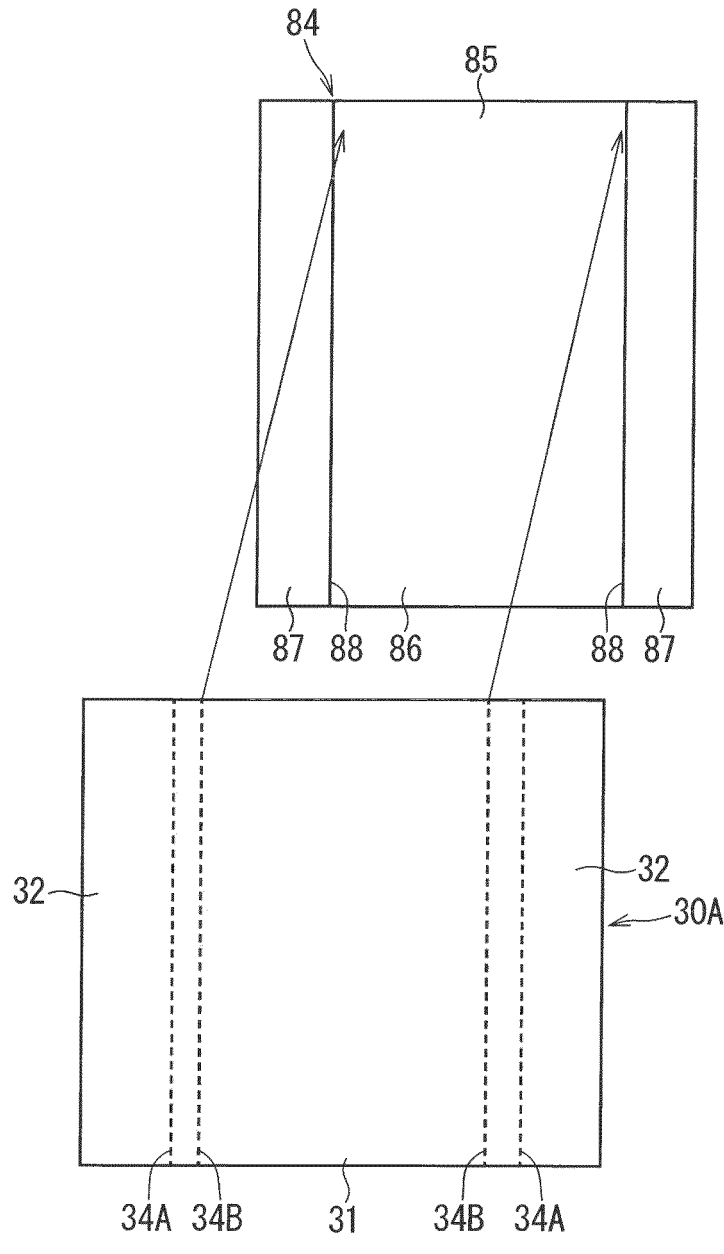
FIG. 4 is a diagram explaining a manufacture of the wiring member according to the embodiment 1.
Figure 5:
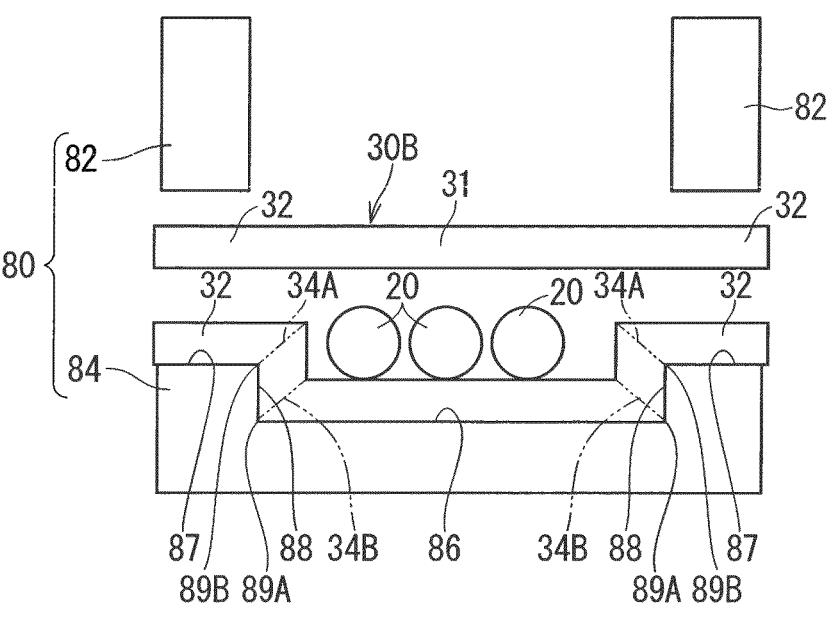
FIG. 5 is a diagram explaining a manufacture of the wiring member according to the embodiment 1.

FIG. 4 and FIG. 5 are explanation diagrams each explaining manufacture of the wiring member 10 according to the embodiment 1.

Firstly, as illustrated in FIG. 4, prepared is a sheet 30A in which the easy bending parts 34A and 34B are formed. In this stage, the sheet 30A is a flat base material. The flat sheet 30A is set to a mold 84.

The mold 84 is the anvil 84 of the ultrasonic welding machine 80, for example. A groove 85 is formed in the mold 84. The mold 84 includes a first support surface 86 as a bottom of the groove 85 and a second support surface 87 on an outer side of the groove 85. The first support surface 86 and the second support surface 87 are connected to each other via a side surface 88 of the groove 85. A first corner part 89A is formed between the side surface 88 and the first support surface 86, and a second corner part 89B is formed between the side surface 88 and the second support surface 87. The first corner part 89A has an inwardly convex shape. The second corner part 89B has an outwardly convex shape.

An intermediate part of the sheet 30A is supported on the first support surface 86. The easy bending part 34B is located in the first corner part 89A, and the easy bending part 34 is located in the second corner part 89B. The sheet 30A is easily bended in the thickness direction at the easy bending parts 34A and 34B, thus the sheet 30A easily follows the surface of the mold 84. The easy bending part 34B is located, thus when the intermediate part of the sheet 30A is disposed in the groove 85, the sheet 30A is easily bended along the inner surface of the groove 85 of the mold 84. The easy bending part 34A is located, thus a part of the sheet 30A serving as the fixing part 32 is easily bended to be close to be parallel to the sheet 30B. Accordingly, as illustrated in FIG. 5, both side end portions of the sheet 30A are easily supported on the second support surface 87.

The wire-like transmission member 20 is set on the sheet 30A in the groove 85. The sheet 30A is bended along the inner surface of the groove 85, thus even when the plurality of wire-like transmission members 20 are housed in the groove 85, the wire-like transmission members 20 hardly overflow the groove 85.

The sheet 30B is set on the wire-like transmission member 20. An intermediate part of the sheet 30B along the width direction thereof covers the wire-like transmission member 20. Both side end portions of the sheet 30B along the width direction have contact with both side end portions of the sheet 30A, respectively. The fusion layer of the sheet 30A and the fusion layer of the sheet 30B have contact with each other. The horn 82 comes in contact with an outer surface of each of both side end portions of the sheet 30B, and the fusion layer of the sheet 30A and the fusion layer of the sheet 30B are fused to each other to form the fixing part 32.

The easy bending part 34 facilitates bending of the sheet 30A when the sheet 30A is set in the mold 84. The easy bending part 34 needs not facilitate bending of the sheet 30A more than the sheet 30B. The sheet 30A may be bended more easily or more hardly than the sheet 30B. A degree of easiness of bending of the sheet 30A may be substantially the same as that of the sheet 30B. It is also applicable that the sheet 30A includes the easy bending part 34, thereby being bended more easily than the sheet 30B.

Comparison Example

Figure 6:
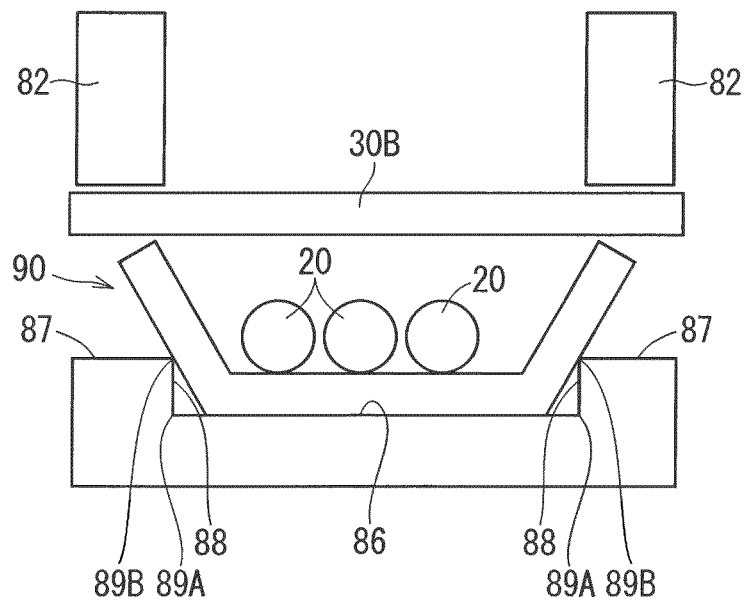
FIG. 6 is a diagram explaining a manufacture of a wiring member according to a modification example.

FIG. 6 is a diagram explaining a manufacture of a wiring member according to a modification example.

In the example illustrated in FIG. 6, a sheet 90 in which the easy bending part 34 is not formed is used in place of the sheet 30A. The other members are the same as the example illustrated in FIG. 5. A configuration of the sheet 90 other than the configuration in which the easy bending part 34 is not formed is the same as the sheet 30A.

As illustrated in FIG. 6, when an intermediate part of the sheet 90 in a width direction is supported on the first support surface 86, the sheet 90 is curved from a part thereof having contact with the first support surface 86 toward both end portions in the width direction. The easy bending part 34 is not formed in the sheet 90, thus the sheet 90 hardly follows a surface of the mold 84. The easy bending part 34B is not formed in the sheet 90, thus the sheet 90 hardly follows the first corner part 89A, and a space may occur between the sheet 90 and the first corner part 89A. Thus, a housing space in the groove 85 gets small. Thus, when the plurality of wire-like transmission members 20 are housed in the groove 85, the wire-like transmission members 20 easily overflow the groove 85. The easy bending part 34A is not formed in the sheet 90, thus the sheet 90 hardly follows the second corner part 89B, and a space may occur between the sheet 90 and the second corner part 89B. The space occurs between the sheet 90 and the first corner part 89A and between the sheet 90 and the second corner part 89B, thus an end portion of the sheet 90 in the width direction is hardly supported on the second support surface 87 in a predetermined support form.

For example, in a case of the sheet 90 having high rigidity, as illustrated in FIG. 6, both side end portions of the sheet 90 are not bended to a side of the anvil 84 on an outer side of the groove 85 but are kept in an extended state. In this state, when the sheet 30B covers the sheet 90 and is fused thereto by applying the horn 82, there is a possibility that a desired position is not fused in the end portion of the sheet 90 in the width direction, or a part and the other part thereof are overlapped with each other in the thickness direction, thus variation occurs in a finish of the fixing part. In a case of the sheet 90 having low rigidity, both side end portions of the sheet 90 may be bended to the side of the anvil 84 on the outer side of the groove 85 and supported on the second support surface 87. However, the sheet 90 may protrude at positions of the first corner part 89A and the second corner part 89B. Thus, also in this case, there is a possibility that a desired position is not fused in the end portion of the sheet 90 in the width direction, or a part and the other part thereof are overlapped with each other in the thickness direction, thus variation occurs in a finish of the fixing part. When the sheet 90 is fused to the sheet 30B in the end portion of the sheet 90 in the width direction while a part and the other part thereof are overlapped with each other in the thickness direction, a thickness dimension of the wiring member may increase.

<Effect Etc.>

According to the wiring member 10 having the above configuration, when the fixing part 32 is provided while the sandwiching part 31 sandwiches the electrical wire, a part of the sheet 30A serving as the fixing part 32 is easily bended to be close to be parallel to the sheet 30B by the easy bending part 34. Accordingly, the fixing part 32 is easily provided. Suppressed is overlap of the part and the other part of the sheet 30A in the thickness direction in the end portion of the sheet 30A in the width direction while the sheet 30A is supported by the mold 84, and increase in the thickness dimension of the wiring member 10 is suppressed.

The easy bending part 34 includes the easy bending part 34A provided in the end portion of the inner side of the fixing part 32 along the width direction of the sheet 30A. Accordingly, a part of the sheet 30A serving as the fixing part 32 is easily bended to be close to be parallel to the sheet 30B. Accordingly, the fixing part 32 is easily provided.

The easy bending part 34 includes the easy bending part 34B provided in a position closer to the wire-like transmission member 20 than the easy bending part 34A along the width direction of the sheet 30A. Accordingly, when the sandwiching part 31 of the sheet 30A is disposed in the groove 85 of the mold 84, the sheet 30A is easily bended along the inner surface of the groove 85 of the mold 84.

The fixing part 32 is the fusion part 32. Accordingly, the sheets 30A and 30B can be directly fixed without intervention of the other member. At this time, the sheets 30A and 30B have contact with each other in the fixing part 32, thus a dimension of the sandwiching part 31 and the fixing part 32 away from each other in the thickness direction gets large compared with a case where an adhesive agent, for example, intervenes therebetween. Also in this case, the easy bending part 34 is located, thus the sheets 30A and 30B easily have contact with each other at the fixing part 32, and the fixing part 32 is easily provided.

The fixing part 32 is the ultrasonic fusion part 32, and the horn mark 33 is formed in the outer surface of the sheet 30B. Accordingly, the sheet 30A is disposed on the anvil 84, and ultrasonic welding is performed so that the horn 82 has contact with the sheet 30B. At this time, the easy bending part 34 is located in the sheet 30A, thus when the sheet 30A is disposed on the anvil 84 with the groove 85, a part of the sheet 30A serving as the fixing part 32 is easily bended to be close to be parallel to the sheet 30B.

Embodiment 2

Figure 8:
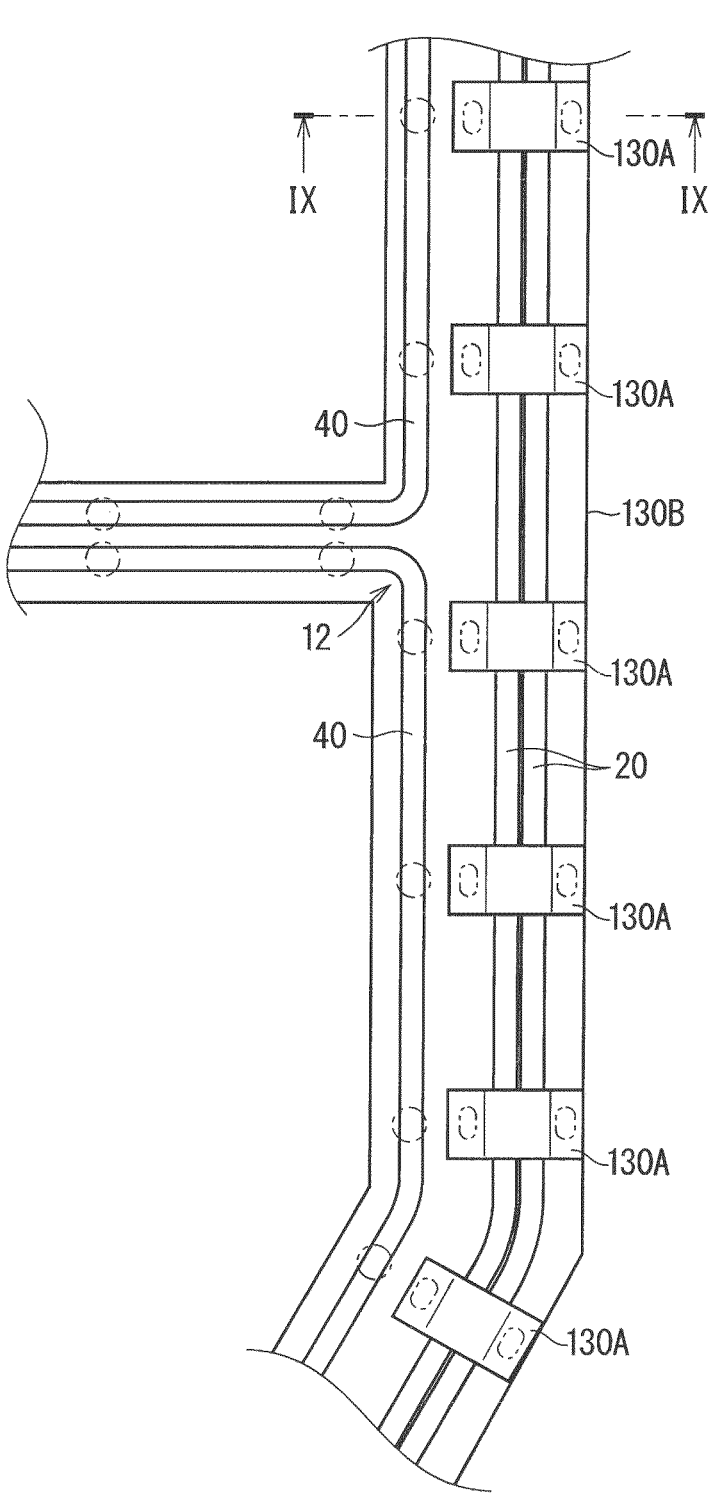
FIG. 8 is a partial enlarged view of FIG. 7.
Figure 9:
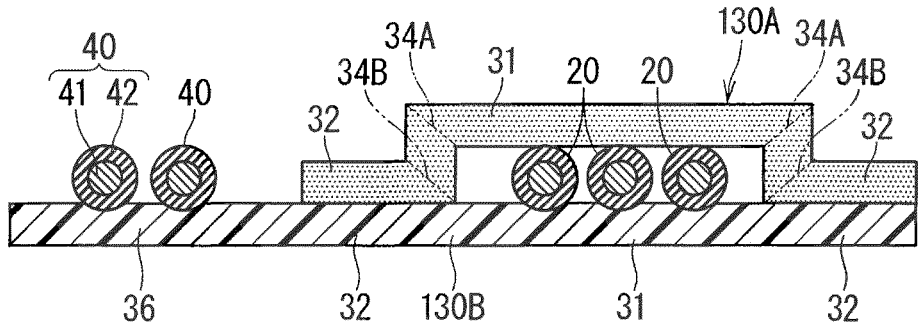
FIG. 9 is a cross-sectional view along an IX-IX line in FIG. 8.

A wiring member according to an embodiment 2 is described. FIG. 7 is a schematic plan view illustrating a wiring member 110 according to the embodiment 2. FIG. 8 is a partial enlarged view of FIG. 7. FIG. 9 is a cross-sectional view along an IX-IX line in FIG. 8. In the following description of the present embodiment, the same reference numerals are assigned to the similar constituent elements described above, and the description thereof will be omitted.

In the wiring member 110 according to the present example, a planar shape of each of sheets 130A and 130B is different from that of each of the sheets 30A and 30B in the wiring member 10 described above. The sheet 130A is partially provided to the sheet 130B along the extension direction of the wire-like transmission member 20. Accordingly, the sheet 130A is smaller than the sheet 130B along the extension direction of the wire-like transmission member 20, thus the easy bending part 34 can be simply provided to the sheet 130A. The sheet 130A is small, thus a weight of the wiring member 110 is reduced.

The sheet 130A is provided in a plurality of positions at intervals along the extension direction of the wire-like transmission member 20 on the sheet 130B. The plurality of sheets 130A are provided so that the wire-like transmission member 20 can keep a state of following a predetermined route on the sheet 130B. For example, the plurality of sheets 130A are disposed in a bending route part, an end portion of a straight route part, or an intermediate part of a relatively long straight route part of the wire-like transmission member 20.

The sheet 130B further includes an extension part 36 extending to a lateral side of the fixing part 32 in the wiring member 110. The other wire-like transmission member 40 different from the wire-like transmission member 20 is disposed in the extension part 36. A covering layer 42 of the other wire-like transmission member 40 is fused to the extension part 36. Accordingly, the wire-like transmission member 20 and the other wire-like transmission member 40 are simply held by the sheets 130A and 130B. In the example illustrated in FIG. 9, the extension part 36 is provided to only one fixing part 32, however, the extension part 36 may be provided to two fixing parts 32. The extension part 36 may be provided not to the sheet 130B but to the sheet 130A.

The wire-like transmission member 40 includes a transmission wire body 41 and a covering layer 42 in the manner similar to the wire-like transmission member 20. The configuration described for the transmission wire body 21 and the covering layer 22 described above can be applied to the transmission wire body 41 and the covering layer 42. The wire-like transmission member 40 is fused to the sheet 130B more easily than the wire-like transmission member 20. A relationship between the wire-like transmission member 20 and the wire-like transmission member 40 may correspond to a relationship between the special wire and the normal wire described in the embodiment 1. The wire-like transmission member 20 is the special wire described above, and the wire-like transmission member 40 is the normal wire described above. In this case, the wire-like transmission member 40 is a single core wire. The single core wire includes one core wire and a covering layer for covering the core wire.

The sheet 130B and the wire-like transmission member 40 are fused to each other by resin included in at least one of the fusion layer of the sheet 130B and/or the covering layer 22 of the wire-like transmission member 40. It is sufficient that a material of the covering layer 22 and a material of the fusion layer have compatibility. Herein, the covering layer 42 of the wire-like transmission member 40 and the fusion layer of the sheet 130B are made of the same resin. A resin material constituting the fusion layer and a resin material constituting the covering layer 42 are PVC or polyolefin, for example.

A connector C is provided on end portions of the wire-like transmission members 20 and 40. The wire-like transmission members 20 and 40 are connected to an apparatus, for example via the connector C. The end portions of the wire-like transmission members 20 and 40 extend to the outer side from the end portion of the sheet 130B. The connector C is provided to an outer side of the sheet 130B. The connector C is provided away from the sheet 130B. The connector C is not fixed to the sheet 130B. The end portions of the wire-like transmission members 20 and 40 may be located on the sheet 130B. The connector C may be provided on the sheet 130B. The connector C may be fixed to the sheet 130B.

In the example illustrated in FIG. 7, the routes of the wire-like transmission members 20 and 40 on the sheet 130B is made up of a combination of a straight route and a bended route. The sheet 130B is also formed into a shape of a combination of a straight route and a bending route. A part of the plurality of wire-like transmission members 20 and 40 including a branch part 12 is fixed to the sheet 130B. A shape of the branch part 12 is thereby maintained. The sheet 130B is also formed into a branch shape corresponding to the branch part 12. A major section of the wire-like transmission members 20 and 40 along the extension direction is fixed to the sheet 130B, and a major route of the wire-like transmission members 20 and 40 can be kept in a route similar to a predetermined route in a vehicle. Accordingly, when the wiring member 110 is assembled to the vehicle, the wire-like transmission members 20 and 40 can be simply routed along the predetermined route.

APPENDIX

In the above description, the easy bending parts 34A and 34B are provided, however, this configuration is not necessary. For example, one of the easy bending parts 34A and 34B may be omitted. For example, the easy bending part 34 may be provided in a position different from the easy bending parts 34A and 34B. The plurality of perforated lines 34 parallel to each other may be formed in a position of one easy bending part 34.

The configurations described in the embodiments and modification examples thereof can be appropriately combined as long as they are not contradictory.

EXPLANATION OF REFERENCE SIGNS

10, 110 wiring member
12 branch part
20, 40 wire-like transmission member
21, 41 transmission wire body
22, 42 covering layer
30, 30A, 30B, 130B, 130B sheet
31 sandwiching part
32 fixing part (fusion part, ultrasonic fusion part)
33 horn mark
34, 34A, 34B easy bending part (perforated line)
35 perforation
36 extension part
80 ultrasonic welding machine
82 horn
84 anvil
85 groove
86 first support surface
87 second support surface
88 side surface
90 sheet
C connector

The invention claimed is:

1. A wiring member, comprising:
a plurality of wire-like transmission members; and
a first sheet and a second sheet sandwiching the plurality of wire-like transmission members, wherein
the first sheet includes a sandwiching part sandwiching the plurality of wire-like transmission members with the second sheet and a fixing part protruding to a lateral side of the plurality of wire-like transmission members from the sandwiching part to be fixed to the second sheet,
the first sheet and the second sheet are closer to each other in a position of the fixing part in a thickness direction in relation to a position of the sandwiching part,
the first sheet has flexibility capable of following bending of the plurality of wire-like transmission members,
an easy bending part in which the first sheet can be easily bended between the sandwiching part and the fixing part is formed in the first sheet,
the first sheet includes a bent part which is bent toward the second sheet via the easy bending part, the plurality of wire-like transmission members include an outer wire-like transmission member which is disposed closest to the bent part, and
the bent part is apart from the outer wire-like transmission member in a parallel direction of the plurality of wire-like transmission members, wherein there is a gap between the bent part and the outer wire-like transmission member.

2. The wiring member according to claim 1, wherein
the first sheet is partially provided to the second sheet along an extension direction of the plurality of wire-like transmission members.

3. The wiring member according to claim 1, wherein
the easy bending part includes a first easy bending part provided to an end portion on an inner side of the fixing part along a width direction of the first sheet.

4. The wiring member according to claim 3, wherein
the easy bending part includes a second easy bending part provided in a position closer to the plurality of wire-like transmission members than the first easy bending part along the width direction of the first sheet.

5. The wiring member according to claim 1, wherein
the fixing part is a fusion part.

6. The wiring member according to claim 5, wherein
the fixing part is an ultrasonic fusion part, and
a horn mark is formed in an outer surface of the second sheet.

7. The wiring member according to claim 5, wherein
the first sheet or the second sheet includes an extension part extending to a lateral side of the fixing part,
another wire-like transmission member different from the plurality of wire-like transmission members is disposed on the extension part, and
a covering layer of the another wire-like transmission member is fused to the extension part.

8. A wiring member, comprising:
a plurality of wire-like transmission members; and
a first sheet and a second sheet sandwiching the plurality of wire-like transmission members, wherein
the first sheet includes a sandwiching part sandwiching the plurality of wire-like transmission members with the second sheet and a fixing part protruding to a lateral side of the plurality of wire-like transmission members from the sandwiching part to be fixed to the second sheet,
the first sheet and the second sheet are closer to each other in a position of the fixing part in a thickness direction in relation to a position of the sandwiching part,
an easy bending part in which the first sheet can be easily bended between the sandwiching part and the fixing part is formed in the first sheet,
the easy bending part includes a first easy bending part provided to an end portion on an inner side of the fixing part along the width direction of the first sheet,
no other easy bending part is located on an inner side of the first easy bending part along the width direction of the first sheet,
the first sheet includes a bent part which is bent toward the second sheet via the easy bending part,
the plurality of wire-like transmission members include an outer wire-like transmission member which is disposed closest to the bent part, and
the bent part is apart from the outer wire-like transmission member in a parallel direction of the plurality of wire-like transmission members, wherein there is a gap between the bent part and the outer wire-like transmission member.

* * * * *